A. A. E. STERZING.
APPARATUS FOR GENERATING STEAM.
APPLICATION FILED JAN. 31, 1905. RENEWED JUNE 25, 1912.

1,129,914.

Patented Mar. 2, 1915.
7 SHEETS—SHEET 1.

Witnesses
H. Christaller
Wm. J. Dolan

Inventor
Albert A. E. Sterzing
By his Attorney
J. H. Freeman

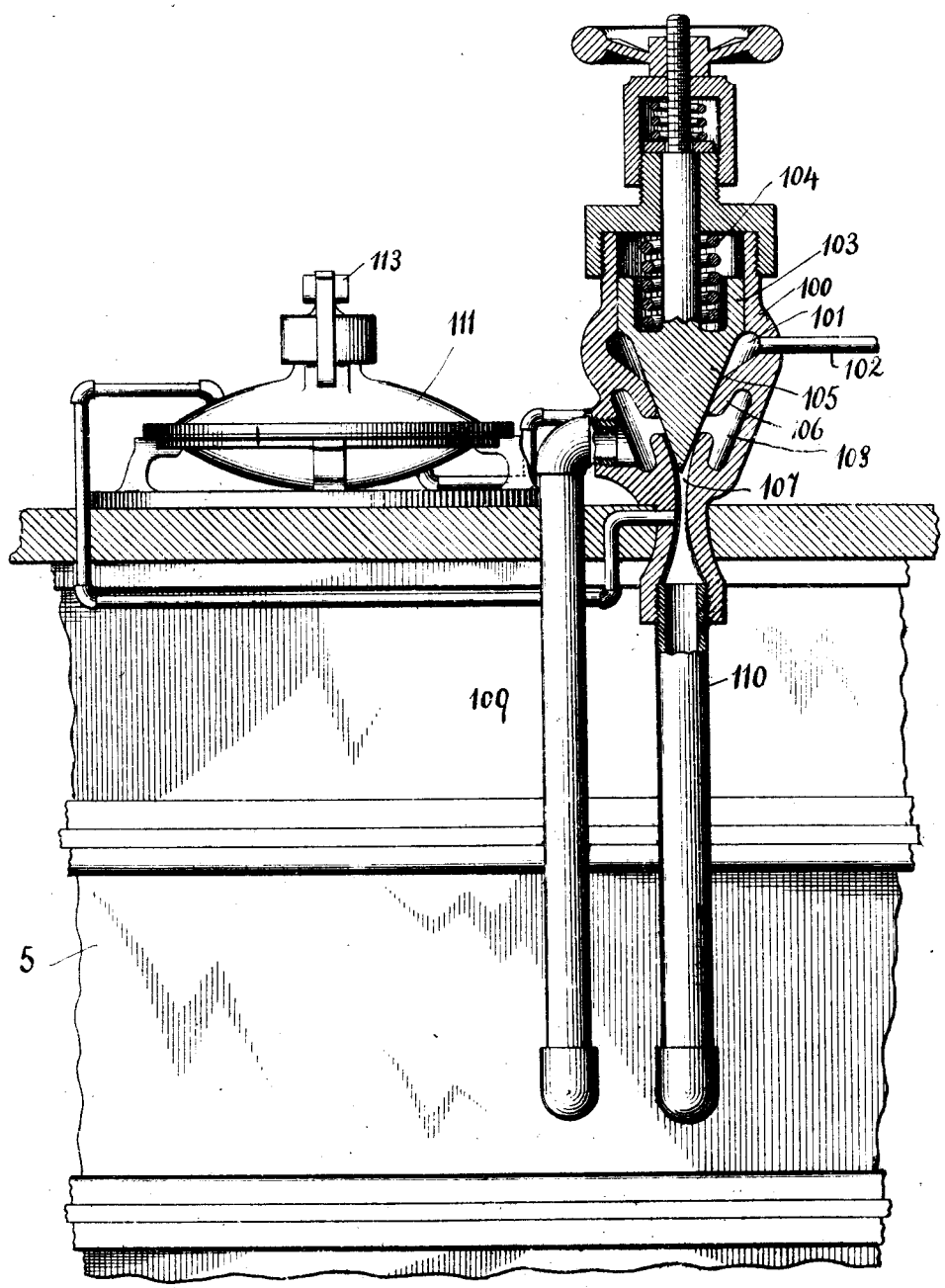

UNITED STATES PATENT OFFICE.

ALBERT A. E. STERZING, OF NEW YORK, N. Y.

APPARATUS FOR GENERATING STEAM.

1,129,914.

Specification of Letters Patent. Patented Mar. 2, 1915.

Application filed January 31, 1905. Serial No. 243,565. Renewed June 25, 1912. Serial No. 705,870.

*To all whom it may concern:*

Be it known that I, ALBERT A. E. STERZING, a subject of the King of Great Britain, and a resident of the city, county, and State of New York, have invented certain new and useful Improvements in Apparatus for Generating Steam, of which the following is a specification.

My present invention relates to the generation of steam, and more particularly to the generation of superheated steam, certain features of the apparatus employed having been set forth and claimed in my prior applications No. 104,449, filed April 24th, 1902, and No. 224,324, renewed September 13th, 1904.

An object of my invention is to provide methods of and apparatus for generating superheated steam whereby the steam may be delivered at a substantially uniform pressure and temperature; also to provide for the automatic regulation of the apparatus so that the quantity of steam generated is varied in approximate conformity with the variations of demand; also to provide for the automatic regulation of the apparatus whereby the same is rendered safe and reliable irrespective of sudden variations of demand, and whereby the employment of a considerable quantity of potentially active reserve energy, either in the form of a mass of highly heated liquid maintained under pressure or in the form of a mass of highly heated metal or other substance, is rendered unnecessary and undesirable. These and other objects of my invention will more fully appear from the following description.

My invention consists in the novel methods, features of construction, combinations, and improvements herein shown and described.

The accompanying drawings, which are referred to herein and form a part thereof, illustrate one embodiment of each of the several features of my invention, the same serving in connection with the description herein to explain the principles of the invention.

Figure 1:
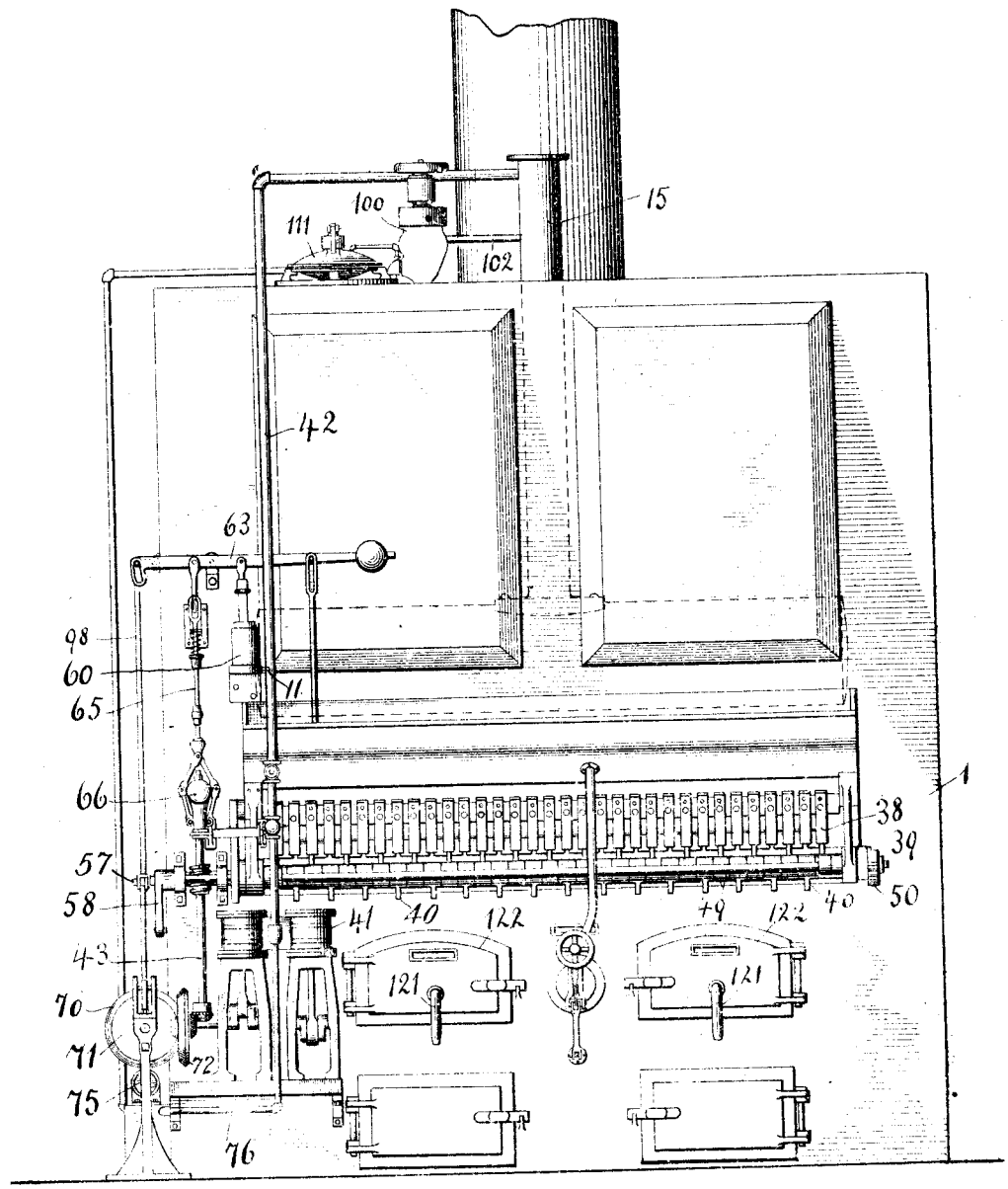
Figure 2:
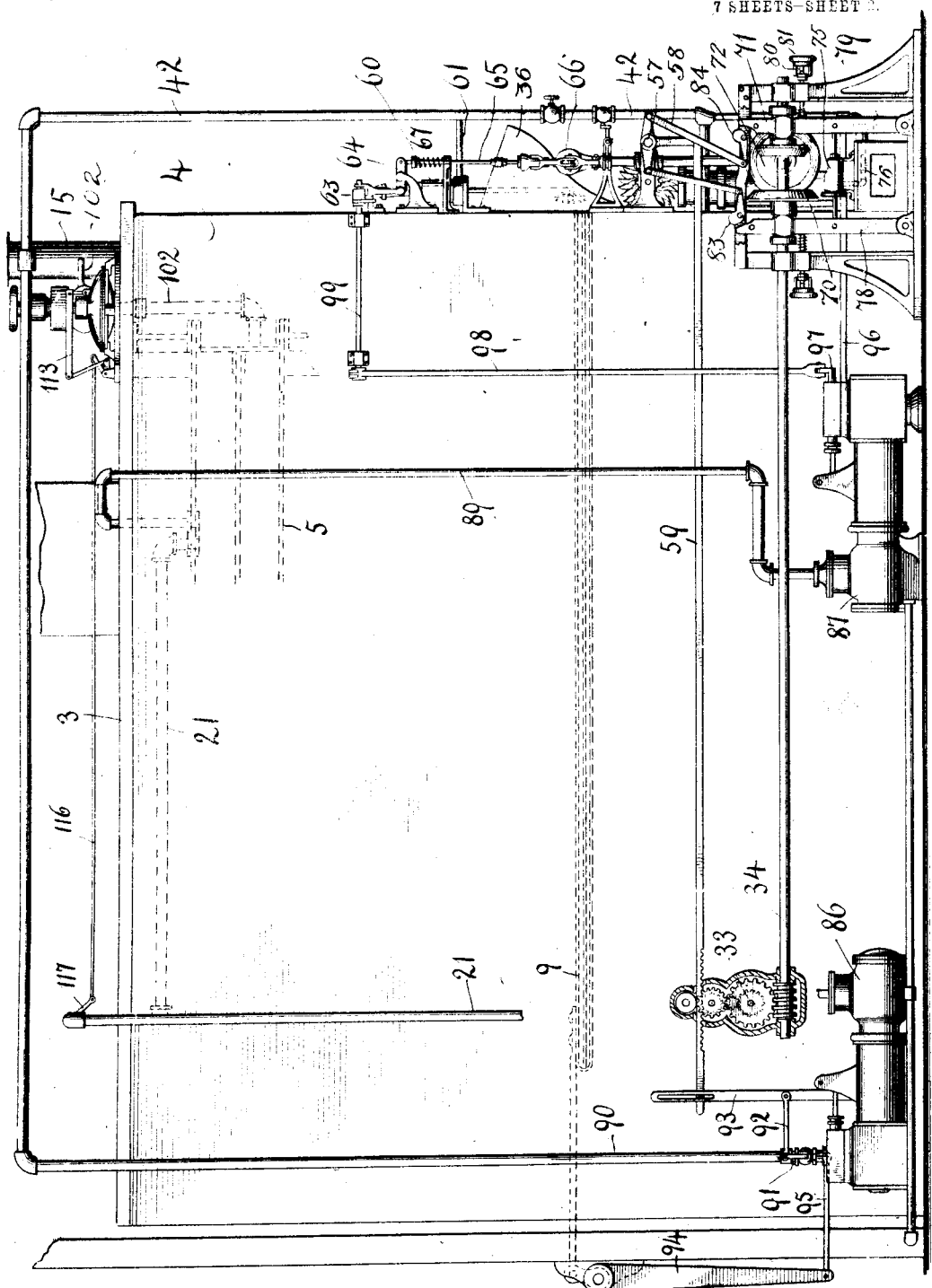
Figure 3:
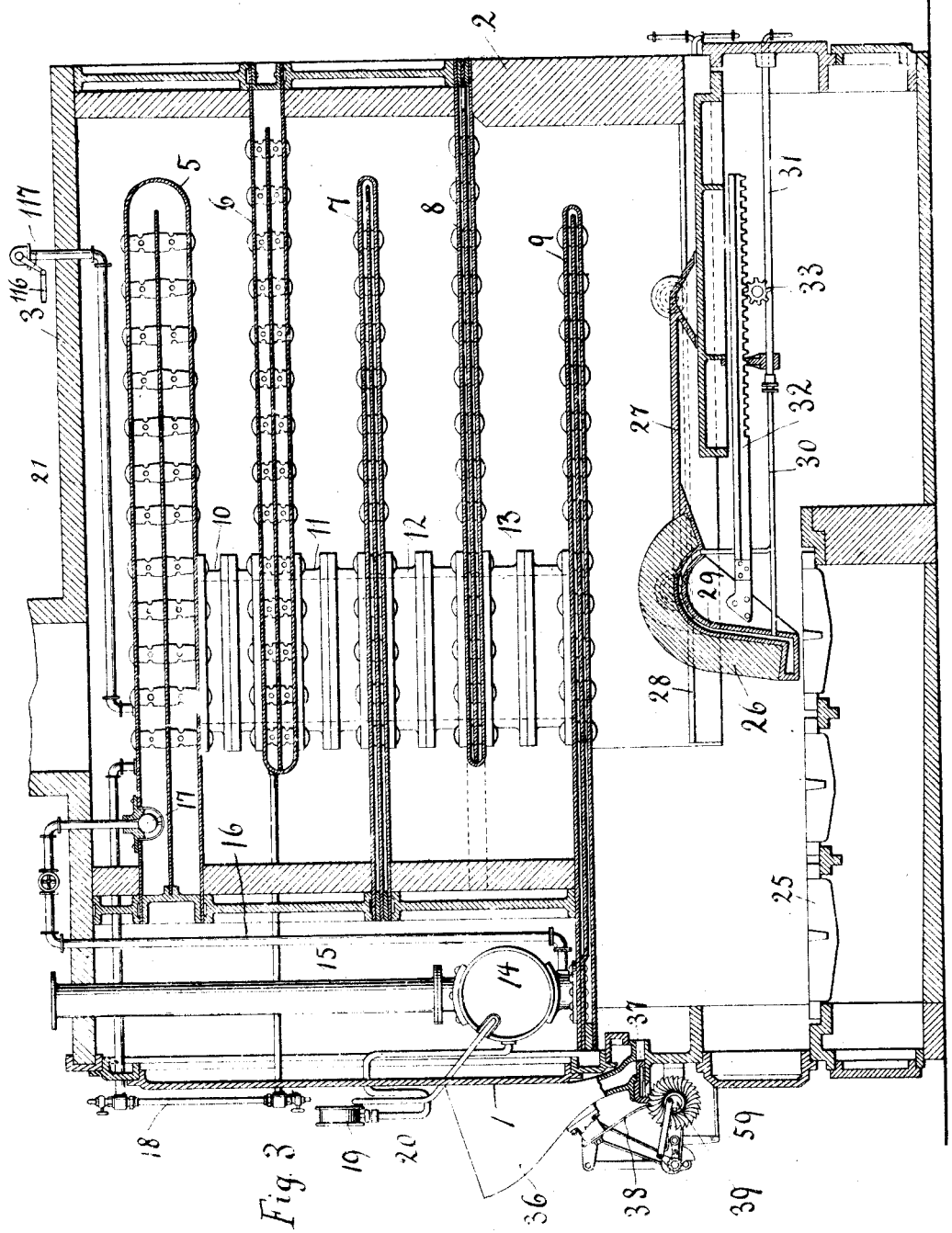
Figure 4:
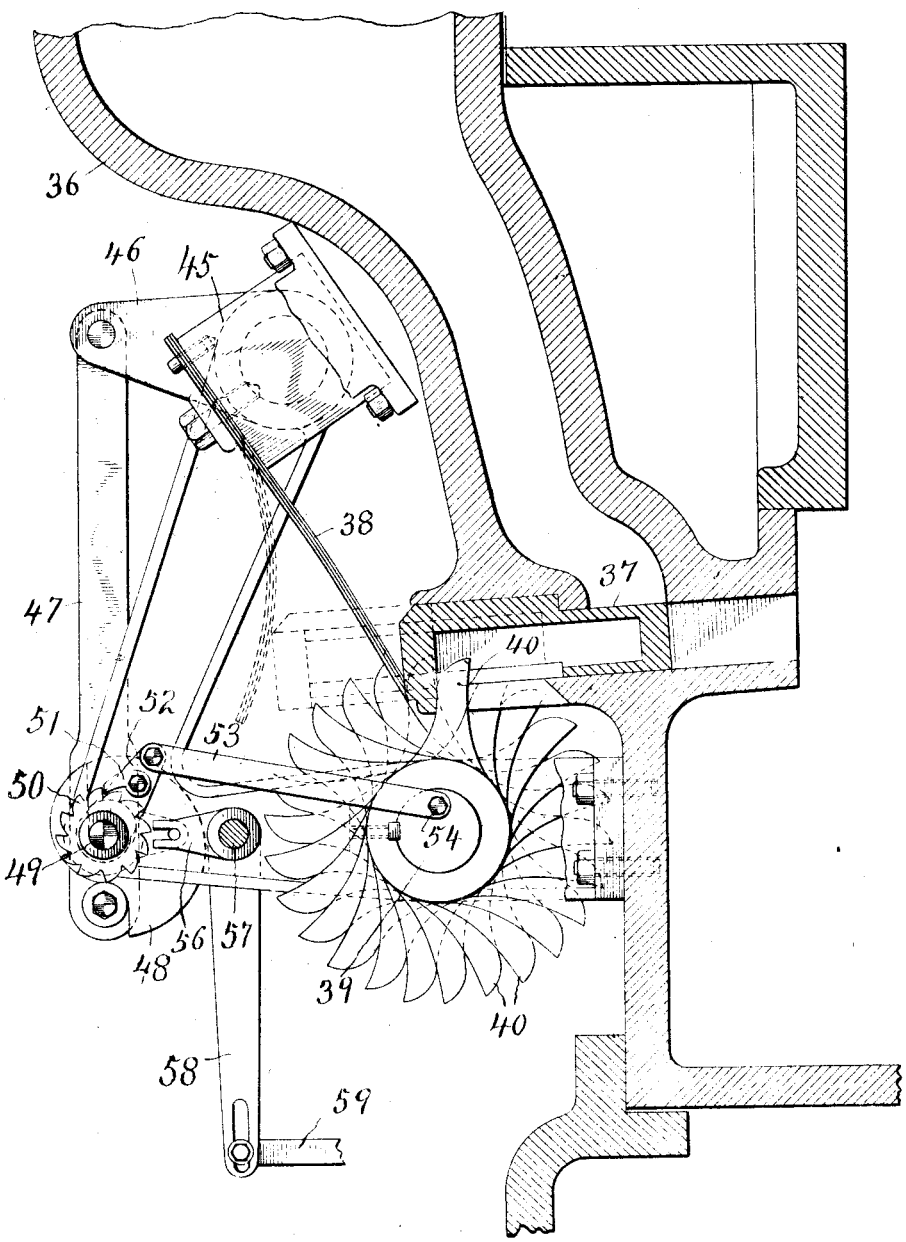
Figure 5:
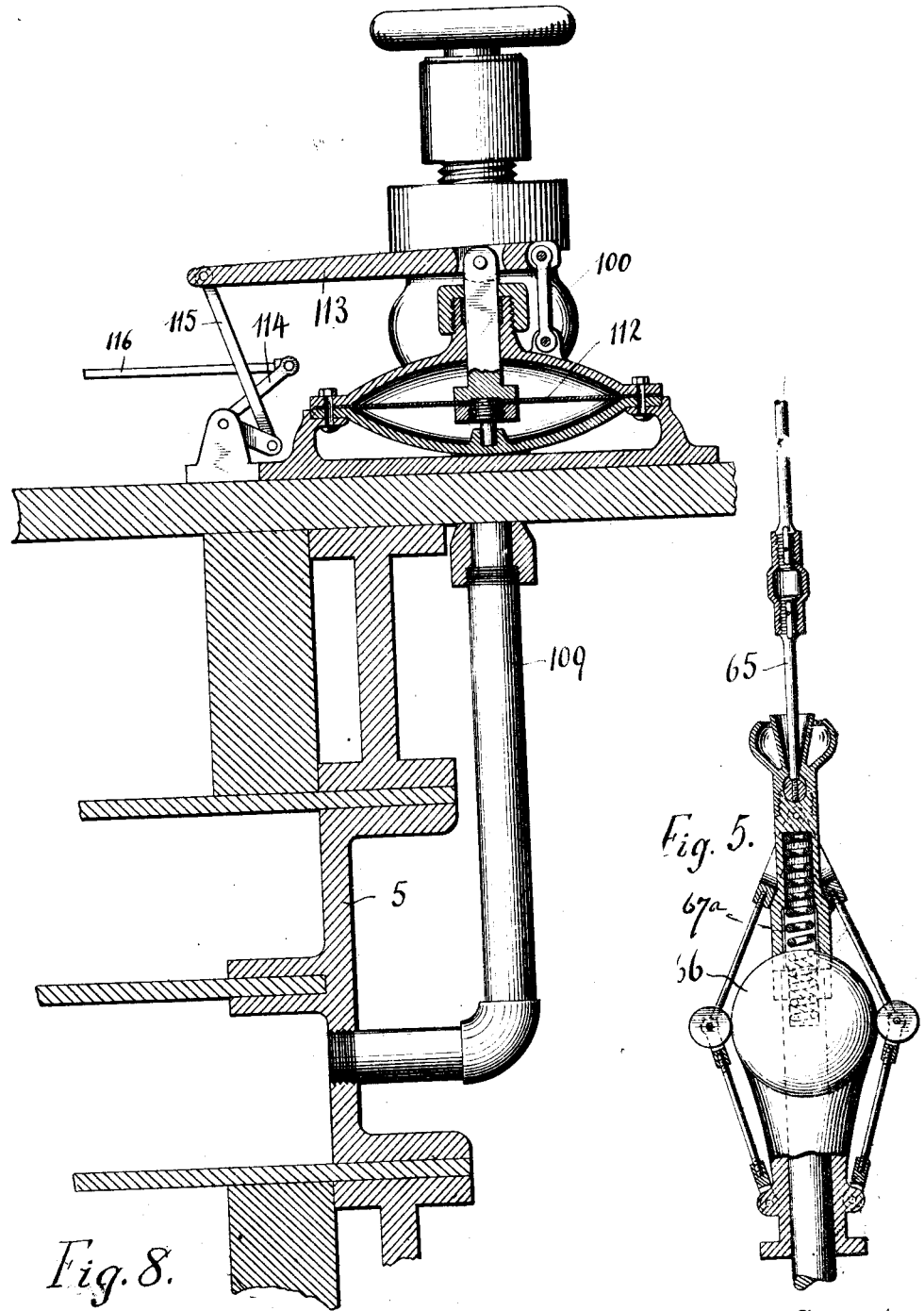
Figure 6:
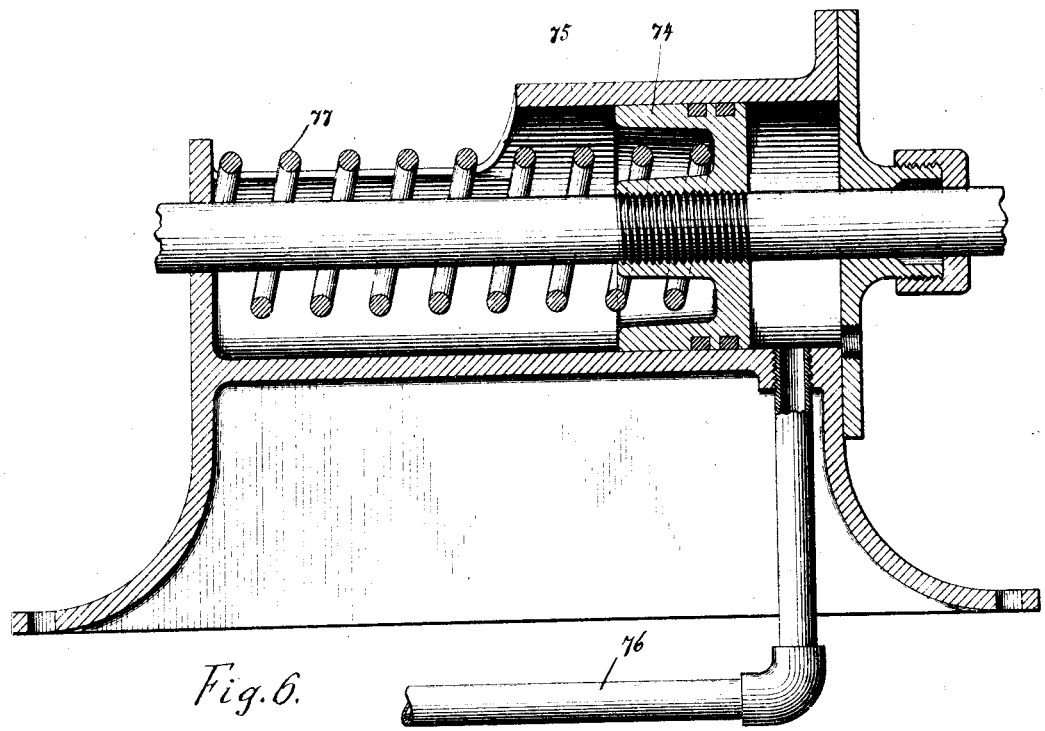

Of the drawings Figure 1 is a front elevation of an apparatus constructed in accordance with my invention; Fig. 2 is a side elevation of the same, as seen from the left in Fig. 1; Fig. 3 is a vertical longitudinal section of the same taken on a line somewhat to the right of the center of Fig. 1; Fig. 4 is a vertical sectional view on an enlarged scale, illustrating certain details of one feature of the apparatus; Figs. 5 and 6 are views, partly in section and partly in side elevation, illustrating the details of certain features of the apparatus; Fig. 7 is a vertical sectional view, partly in elevation, illustrating details of a certain feature of the apparatus; Fig. 8 is a similar view of the same, the section being taken at right angles to that of Fig. 7.

Referring in detail to the particular embodiment of the invention and the several features thereof illustrated in the drawings, 1 represents the front wall of the casing or housing in which the furnace and generator are inclosed, 2 the rear wall, 3 the top, and 4 one of the side walls of the same.

So far as some of the features of my invention are concerned, any suitable form of generator may be employed. In accordance with certain features of the invention, however, the generator is constructed and arranged with relation to the furnace so that the water supplied thereto is gradually heated to the temperature of vaporization and is thereafter gradually vaporized and the steam superheated and delivered in the superheated condition, the generator having a single continuous passage so arranged that the flow of the fluid therethrough takes place in a direction opposite to that in which the products of combustion from the furnace flow through the generator. The generator illustrated in the drawings is substantially the same as that illustrated in my prior application, Serial No. 104,449 above referred to. Briefly described, this generator consists of a series of generator elements 5, 6, 7, 8, and 9, each consisting of 3 flat metal plates so secured at their edges and at suitable intermediate points as to form a shallow chamber having considerable length and width as compared with its depth, said chamber being divided throughout the greater part of its length into upper and lower portions forming two parts of a continuous passage, the lower passage of each element being connected near one end to the corresponding end of the upper passage of the adjoining element so that a single continuous passage is formed from one end of the generator to the other.

The connections between the several elements are preferably in the form of flanged joints 10, 11, 12, and 13, preferably arranged at both sides of the generator and made successively longer, those at the end of the generator farthest from the furnace being the shortest and those at the end nearest the furnace being the longest as indicated in the drawing, so as to provide between the series of elements a single continuous passage for the products of combustion which gradually decreases in sectional area from the end nearest the furnace to the end farthest from the furnace to correspond with the decrease in the volume of the products of combustion resulting from the gradual cooling thereof. The two elements 5 and 6 farthest from the furnace are preferably made of greater depth than the other elements, so that a considerable quantity of water is maintained in the generator at a temperature below the temperature of vaporization, the water being gradually vaporized and the steam generated therefrom superheated by the elements 7, 8, and 9 nearest the furnace, the passages in said elements being so small as to properly retard the flow of the fluid toward the hotter portion of the generator and prevent the same from being suddenly projected upon the metal which is at such a temperature as would cause the water to enter the spheroidal state. The superheated steam is preferably delivered from the lower element into a steam drum 14 and from there to the steam delivery pipe 15.

To aid in the proper starting of the generator, the delivery end of the lowermost element 9 is connected by a pipe 16 to the uppermost element, a float valve 17 being provided in the upper element 5 to control the flow of fluid through said pipe. To assist in starting the generator, also, a water gage 18 is placed in communication at its lower end with the element 6 and at its upper end with the element 5. The function of these parts is to enable the generator to be filled up to the proper point before starting the furnace, and then after the furnace is started to permit the water in the lower part of the generator to be forced by the pressure of the steam generated therein to the upper part of the generator, the float 17 serving to prevent the flow of steam from the delivery end of the generator to the supply end when the latter is filled with water. The pressure gage 19 is connected with the steam drum 14 and a thermostat 20 may be provided, if desired, for indicating the temperature of the steam in the drum.

21 indicates a pipe through which water is supplied to the upper element of the generator.

So far as some of the features of my invention are concerned, any suitable form of furnace may be provided to which the fuel may be fed in any desired manner. In accordance with one feature of the invention, however, a furnace of the character set forth in my application, Serial No. 224,324 above referred to, is employed and automatic means are provided for supplying fuel to the same, said means being preferably, also, of the same character as the automatic fuel-supplying means illustrated in the same application. As shown, the furnace includes a substantially horizontal grate 25, the effective area of which may be varied in any suitable way. As shown, a suitable back wall is provided, the same consisting of a wall 26 of refractory material mounted on a carriage 27 supported at opposite sides of the furnace by guide rails 28 and preferably kept at a proper temperature by a water cooling system including a water chamber 29 and pipe connections 30, 31 which may form part of the feed water system. Any suitable means may be provided for moving the wall 26 so as to vary the effective area of the grate surface of the furnace. As shown, a rack bar 32 is connected with the carriage 27 and arranged to mesh with a pinion fixed on a transverse shaft 33, said shaft being extended through the side wall of the furnace and provided with a worm and wormwheel connected with a longitudinal shaft 34 which is preferably driven and automatically controlled in the manner presently to be described.

The means for feeding fuel to the furnace illustrated in the drawings consists of a fuel hopper 36 communicating at its lower end with a series of horizontal chambers arranged transversely of the furnace near the upper forward end of the same. In each of the chambers is arranged a reciprocating piston or plunger 37, which when retracted is adapted to be suddenly driven inwardly by spring 38 so as to project a small quantity of fuel into the combustion chamber, the distance to which the fuel is projected being dependent upon the tension of the spring 38.

For the purpose of retracting the series of plungers 37 against the tension of their springs and then suddenly releasing said plungers, a horizontal shaft 39 is journaled in suitable framework below the series of plungers, said shaft being provided with a series of cam fingers 40, each adapted to engage one of the plungers 37. The cam fingers are preferably arranged in the form of a helix on the shaft 39 so that the plungers 37 will be operated successively. The shaft 39, as shown, is driven by a donkey engine 41 receiving steam from the delivery pipe 15 of the generator through a pipe 42, said engine being connected with the shaft 39 by means of a vertical shaft 43 having a bevel gear connection with the engine at its lower end and worm and wormwheel connection at its upper end with the shaft 39. For the purpose of varying the tension of the springs 38 so as to cause the fuel to be driven to all parts of the furnace, preferably to successively greater distances from the front to the rear thereof, the springs are fixed to a rock shaft 45 having an arm 46 which is connected by link 47 to a cam 48 fixed on a transverse shaft 49 receiving a slight rotary motion in proper time relation with the shaft 39, by any suitable means, as a ratchet wheel 50 engaged by pawl 51 mounted on an oscillating arm 52 operated by a link 53 connected with pin 54 eccentrically mounted on the end of the shaft 39.

It will be seen that as the cam 48 is rotated, the tension of the springs 38 will be gradually increased so as to project the fuel farther and farther into the furnace and then suddenly decrease so as to start again at the beginning of the furnace and repeat the operation. In order that the maximum distance to which the fuel is projected in the furnace may be varied in accordance with the position of the movable back wall 26, the effect of the cam 48 on the springs 38 is varied, preferably in an automatic manner, by suitable connections with the mechanism by which the back wall is moved. As shown, a shaft 49 is mounted in eccentric bearings which are rocked back and forth to vary the height of the shaft 49 by arms 56 affixed on a transverse rock shaft 57 having an arm 58 adjustably connected to a bar 59 having suitable gear connection with the shaft 33, as clearly illustrated in Fig. 2.

Any suitable means may be provided for automatically varying the supply of fuel to the furnace to approximately meet the variations of the demand for steam. Preferably, the means for varying the supply of fuel are rendered operative by some condition of the fluid in the generator which varies with the variations of demand for steam. Preferably, and as shown, the variations of the condition as to pressure of the fluid in the generator are employed for this purpose.

In accordance with the construction illustrated, a piston chamber 60 having a spring or weight-controlled piston therein is connected at a point below the piston by a pipe 61 with the steam supply pipe 42 so as to be at all times subjected to the pressure of the steam in the generator. The piston 60 is, as shown, connected with a weighted lever 63 pivotally mounted on the front wall 1 adjacent to the piston chamber 60 and having a link connection with a lever 64 suitably pivoted adjacent to the lever 63, as shown in Fig. 2, said lever 64 being connected by a rod 65 with a centrifugal governor 66 by which the flow of steam to the donkey engine 41 is controlled. The weight of the governor is preferably counterbalanced by springs 67—67ª, and the parts are so arranged that upon an increase in the pressure of the steam the supply of steam to the donkey engine will be reduced so as to reduce the rate of supply of fuel to the furnace.

In accordance with one feature of my invention, means are also provided whereby the size of the furnace is automatically varied to approximately conform to the variations in the quality of fuel supplied and to the variations of demand for steam. Any suitable means may be provided for this purpose. In accordance with the particular construction illustrated the shaft 34 is provided with a pair of oppositely arranged bevel wheels, preferably friction wheels, 70 and 71, said wheels being splined on the shaft and arranged to alternately move into and out of coöperative relation with a corresponding pair of bevel wheels 72 and 73 fixed on the shaft of the donkey engine.

For the purpose of throwing one or the other of the bevel wheels 70 and 71 into operation in accordance with variations in the pressure of the steam in the generator the piston 74 is provided, the same being mounted in a cylinder 75, which may be connected in any suitable way to a source of pressure which varies with the variations of demand for steam or with the variations in the rate at which the fuel is supplied to the generator. As shown, the cylinder 75 is connected by a pipe 76 with the pipe 42 by which steam is supplied to the donkey engine, and preferably at a point in said pipe between the point at which the governor is connected and the engine, so that the movement of the piston will vary with the pressure in the engine and consequently with the speed of the engine, the piston 74 being moved in opposition to the pressure by a spring 77. Any suitable connections may be provided between the piston 74 and the friction wheels 70 and 71. As shown, the opposite ends of the piston rod are connected to a pair of vertical levers 78 and 79, the same being arranged to engage grooves in the hubs of the friction wheels 70 and 71, respectively. It follows from this construction that when the speed of the engine is increased, the wheel 70 will be thrown into operation and the shaft 34 will be rotated in the direction required to move the wall 26 so as to increase the size of the furnace, and when the speed of the engine is reduced the friction wheel 70 will be thrown out of operation and the wheel 71 thrown into operation so as to decrease the size of the furnace. In order that the automatic operation of these devices may be stopped, if desired, and hand control substituted, suitable means may be provided for controlling the levers 78 and 79 independently of the piston 74. As shown, each of said levers is provided with a threaded link rod 80 having a hand-operated stop member 81 therein which may be so operated as to force the desired one of the wheels 70 or 71 into operative position, the other wheel 70 being simultaneously thrown out of operation. In order that the automatic operation of the shaft 34 may be automatically stopped when the back wall 26 reaches either limit of its stroke, any suitable means may be provided. As shown, a pair of cam levers 83 and 84 are mounted in such relation to the ends of the levers 78 and 79 that said levers may be moved so as to throw the corresponding wheels out of operative position. As shown, the cam levers 83, 84 are connected by suitable links with the rock shaft 57, which as above described, is operated by the bar 59, having positive gear connection with the shaft 33. The connections are such that when the back wall 26 reaches the rear limit of its stroke, the wheel 70 will be thrown out of operation; and when the back wall reaches the forward limit of its stroke, the wheel 71 will be thrown out of operation.

So far as some of the features of my invention are concerned, any suitable means may be provided for supplying water to the generator. In accordance with certain features of the invention, however, the means for supplying water to the generator are rendered operative or controlled so as to automatically vary the supply of water in approximate accordance with the variations of demand for steam in such manner that the steam will be delivered at a substantially uniform pressure and temperature.

In accordance with the preferred embodiment of the invention, the supply of water is varied directly with the variations in the quantity of fuel supplied to the generator and with the variations in the size of the furnace. The supply of water is preferably, also, varied with the variations of the condition of the fluid in the generator, the means for varying the supplies in accordance with the best construction being rendered operative to vary the supply inversely with the variations of pressure in the generator and directly with the variations in the temperature of the steam delivered from the generator.

In accordance with one feature of the invention, a plurality of means for supplying water to the generator are provided, and preferably the supply from one of said devices is varied with variations of one condition of the fluid in the generator, and the supply from another supply device is varied with variations of another condition of the fluid in the generator.

In accordance with the particular embodiment of the invention illustrated, two steam pumps 86 and 87 are provided, the pump 86 being connected to the supply pipe 21, and the pump 87 being connected to the generator element 5 by a pipe 89. The pumps may be driven from any suitable source. As shown, the pump 86 is connected with the steam delivery pipe 15 by a pipe 90. For the purpose of controlling the effective delivery of this pump so as to vary the supply of water therefrom in accordance with the variations in the size of the furnace, a throttle valve 91 in the steam pipe 90 is connected by means of a link 92 and lever 93 with the rod 59. The supply of water from this pump is also varied with the variations in the temperature of the steam delivered from the generator by means of a lever 94 which is connected at one end to the rear end of the last generator element 9, as indicated in dotted lines in Fig. 2, and at the other end by means of a link 95 with a suitable throttle valve in the steam pipe 90 in such manner that as the temperature of the element 9, and consequently of the steam delivered therefrom, rises, the supply of steam to the pump is increased and the supply of water correspondingly increased. The pump 87 is preferably supplied with steam by a pipe 96 which is connected with the steam pipe 42 at a point between the governor controlled valve and the engine so that the speed of the pump 87 will be varied directly with the speed of the donkey engine, and the quantity of water supplied by the pump 87 thereby increased in accordance with the increase in the supply of fuel to the furnace. The supply of steam to the pump 87 is preferably, also, controlled by variations in the condition of the fluid in the generator as to the pressure thereof, the connections being such that when the pressure in the generator rises above a predetermined point, the supply of steam will be entirely cut off from the pump 87. To this end a throttle valve 97 on the pump is connected by the link 98 and rock shaft 99 to the end of the lever 63, the said lever 63, preferably, being provided with a slot so that a supply of steam to the pump is not effected until the pressure in the generator reaches a predetermined point; but when the pressure in the generator rises above that point, the supply of steam to the pump will at first be reduced and then entirely cut off.

With a generator and furnace of the character herein shown and described a sudden decrease in or cessation of the demand for steam would be apt to cause a material rise in pressure of the steam in the generator for the reason that the effective heat of the furnace cannot be suddenly reduced or entirely stopped.

In accordance with one feature of my invention, means are provided for taking care of the steam generated in excess of the demand at any time so as to prevent an abnormal or dangerous rise in the pressure. In accordance with this feature of the invention, this is accomplished by condensing the steam, preferably in such a manner that the heat thereof may be returned to the apparatus and effectively utilized. In accordance with the embodiment of this feature of the invention illustrated, a steam injecting device is employed, the details of which are illustrated in Fig. 7. As here shown, the casing 100 is provided, the same having a steam chamber 101 connected to the steam delivery pipe 15 by a pipe 102. Within the steam chamber is arranged a piston 103 pressed downwardly by a strong compression spring 104 in such manner as to seat the valve 105 on a seat 106 provided therefor in the lower part of the chamber 101. When the pressure in the generator rises beyond a predetermined point, the valve 105 will be elevated from its seat. In axial alinement with the valve 105 a suitably tapered injector passage 107 is provided, the same communicating at its upper end with a chamber 108 which is connected by the pipe 109 with the lower part of the upper generator element 5 and the lower end of said passage is connected by a pipe 110 with the same element. It follows from this construction that when the demand for steam is suddenly reduced or cut off and the pressure rises in the generator, the valve 105 will be opened and the steam delivered into the water in the chamber 108 and an injector action set up, which will cause a circulation of water and a condensation of the steam, the water in the element 5 being at a temperature considerably below the temperature of vaporization corresponding to the pressure in the generator.

In accordance with another feature of the invention, the supply of water to the generator is reduced by an amount corresponding to the quantity of steam which is generated in excess of the demand. This can be accomplished in any suitable way. In accordance with the particular embodiment of this feature of the invention illustrated, a diaphragm regulator 111 is connected at opposite sides of the diaphragm 112 with the opposite sides of the injector passage 107 in such manner that the movement of the diaphragm will vary in accordance with the quantity of fluid passing through the injector. The diaphragm 112 is connected by means of suitable levers 113, 114 and links 115 and 116 with a throttle valve 117 in the delivery pipe 21 of the pump 86 so as to vary the flow of water through said pipe in substantial accordance with the variations of flow of fluid through the injector. The parts are preferably so adjusted that the pump 87 will be stopped before the injector is brought into operation. It will be seen that the heat of the steam generated, by means of the injector, will be returned to the water in the generator.

It is to be distinctly understood that my invention in its broader aspects is not limited to the particular constructions herein shown and described, as many changes may be made therein without departing from the main principles of the invention and without sacrificing its chief advantages.

Having thus described my invention, what I claim as new and desire to secure by Letters Patent is:

1. An apparatus for generating superheated steam including in combination, a generator having a passage constructed and arranged to receive water at one end and to deliver superheated steam at the other end, a plurality of devices for supplying water to the generator, controlling-means therefor, pressure-operated mechanism operatively connecting with one of said controlling-means and with said generator and acting under the influence of fluid therein and rendered operative with variations of one condition of the fluid in the generator for controlling supply of water to the generator, and mechanism operatively connected with another of said controlling-means and with the generator and acting under the influence of fluid therein and rendered operative with variations of another condition of the fluid in the generator for controlling supply of water to the generator.

2. An apparatus for generating superheated steam including in combination, a generator having a passage constructed and arranged to receive water at one end and to deliver superheated steam at the other end, a plurality of devices for supplying water to the generator, controlling-means therefor, pressure-operated mechanism operatively connecting with one of said controlling-means and with said generator and acting under the influence of fluid therein and rendered operative with variations of the pressure in the generator, for controlling supply of water to the generator, and mechanism operatively connected with another of said controlling-means and with the generator and acting under the influence of fluid therein and rendered operative with variations of the temperature of the superheated steam delivered from the generator for controlling supply of water to the generator.

3. An apparatus for generating superheated steam including in combination, a furnace, a generator having a passage constructed and arranged to receive water at one end and to deliver superheated steam at the other end, means for supplying fuel to the furnace, a plurality of devices for supplying water to the generator, controlling-means for said supply-instrumentalities, mechanism operatively connected to the controlling-means for one of said supply devices and acting under the influence of fluid in the generator and rendered operative with variations of one condition of the fluid in the generator for controlling the fuel-supply and water supply, and mechanism operatively connected with the controlling-means for another of said water-supply devices and acting under the influence of fluid in the generator and rendered operative with variations of another condition of the fluid in the generator for controlling supply of water to the generator.

4. An apparatus for generating steam including in combination, a furnace, a generator, means for supplying fuel to the furnace, a plurality of devices for supplying water to the generator, controlling-devices therefor, means operative on certain of said controlling-devices and rendered operative with variations of one condition of the fluid in the generator for controlling the fuel-supply means and one of said water-supply devices, automatic means for varying the supply of fuel, and means operative on other of said controlling devices and rendered operative with variations of another condition of the fluid in the generator for controlling another of said water-supply devices.

5. An apparatus for generating steam including in combination, a furnace, a generator, means for supplying fuel to the furnace, a plurality of devices for supplying water to the generator, controlling-devices therefor, means operative on certain of said controlling-devices and rendered operative with variations of the pressure of the fluid in the generator for controlling the fuel-supply means and one of said water-supply devices, and means operative on other of said controlling devices and rendered operative with variations of the temperature of the fluid in the generator for controlling another of said water-supply devices.

6. An apparatus for generating superheated steam including in combination, a furnace, a generator having a single continuous passage so arranged with relation to the furnace that the water is gradually heated to the temperature of vaporization and is then gradually vaporized and superheated, a plurality of devices for supplying water to the generator, controlling-devices therefor, means operative on certain of said controlling devices and rendered operative by variations of one condition of the fluid in the generator for controlling one of said supply devices, and means operative on other of said controlling devices and rendered operative with variations of another condition of the fluid in the generator for controlling another of said supply devices.

7. An apparatus for generating superheated steam including in combination, a furnace, a generator having a single continuous passage so arranged with relation to the furnace that the water is gradually heated to the temperature of vaporization and is thereafter gradually vaporized and superheated, a plurality of devices for supplying water to the generator, controlling-devices therefor, means operative on certain of said controlling devices and rendered operative by variations in the pressure of the fluid in the generator for varying the supply from one of said devices inversely with the variations of pressure, and means operative on other of said controlling devices and rendered operative with variations of the temperature of the steam delivered from the generator for varying the supply from another of said devices directly with said variations of temperature.

8. An apparatus for generating superheated steam including in combination, a furnace, means for supplying fuel to the furnace and automatic means for varying the supply of fuel, a generator having a single continuous passage so arranged with relation to the furnace that the water is gradually heated to the temperature of vaporization and is then gradually vaporized and superheated, a plurality of devices for supplying water to the generator, controlling-devices therefor, means operative on certain of said controlling-devices and rendered operative by variations of one condition of the fluid in the generator for controlling one of said supply devices, and means operative on other of said controlling devices and rendered operative with variations of another condition of the fluid in the generator for controlling another of said supply devices.

9. An apparatus for generating superheated steam including in combination, a furnace, a generator having a single continuous passage so arranged with relation to the furnace that the water is gradually heated to the temperature of vaporization and is thereafter gradually vaporized and superheated, means for supplying fuel to the combustion chamber, a plurality of devices for supplying water to the generator, controlling-devices therefor, means operative on certain of said controlling-devices and rendered operative with variations of one condition of the fluid in the generator for controlling the fuel-supply means and also one of said water-supply devices, and means operative on other of said controlling devices and rendered operative with variations of another condition of the fluid in the generator for controlling another of said supply-devices.

10. An apparatus for generating superheated steam including in combination, a furnace, a generator having a single continuous passage so arranged with relation to the furnace that the water is gradually heated to the temperature of vaporization and is thereafter gradually vaporized and superheated, means for supplying fuel to the combustion chamber, a plurality of devices for supplying water to the generator, controlling-devices therefor, means operative on certain of said controlling-devices and rendered operative with variations of the pressure of the fluid in the generator for controlling the fuel-supply means inversely with the variations of pressure and also one of said water-supply devices, and means operative on other of said controlling devices and rendered operative with variations of the temperature of the steam delivered from the generator for varying the supply from another of said devices directly with said variations of temperature.

11. An apparatus for generating superheated steam including in combination, a furnace, a generator consisting of a single continuous passage constructed and arranged in coöperative relation with the furnace to gradually vaporize the water and superheat the steam, two pumps for supplying water to that portion of the generator farthest from the furnace, controlling-devices interposed between the pumps and the generator and means acting on one of said controlling-devices and adapted to be rendered operative by variations of one condition of the fluid in the generator for controlling one of said pumps, and means acting on other of said controlling devices and adapted to be rendered operative with variations of another condition of the fluid in the generator for controlling the other pump.

12. An apparatus for generating superheated steam including in combination, a furnace, a generator consisting of a single continuous passage constructed and arranged in coöperative relation with the furnace to gradually vaporize the water and superheat the steam, two pumps for supplying water to that portion of the generator farthest from the furnace, controlling-devices interposed between the pumps and the generator and means acting on one of said controlling-devices and adapted to be rendered operative by variations of the pressure of the fluid in the generator for controlling one of said pumps, and means acting on other of said controlling-devices and adapted to be rendered operative with variations of the temperature of the superheated steam delivered from the generator for controlling the other pump.

13. An apparatus for generating superheated steam including in combination, a furnace, a generator consisting of a single continuous passage constructed and arranged in coöperative relation with the furnace to gradually vaporize the water and superheat the steam, means for supplying fuel to the furnace and automatic means for varying the supply of fuel, two pumps for supplying water to that portion of the generator farthest from the furnace, controlling-devices interposed between the pumps and the generator and means acting on one of said controlling-devices and adapted to be rendered operative by variations of one condition of the fluid in the generator for controlling one of said pumps, and means acting on other of said controlling-devices and adapted to be rendered operative with variations of another condition of the fluid in the generator for controlling the other pump.

14. An apparatus for generating superheated steam, including in combination, a furnace, a generator consisting of a single continuous passage constructed and arranged in coöperative relation with the furnace to gradually vaporize the water and superheat the steam, means for supplying fuel to the furnace and automatic means for varying the supply of fuel, two pumps for supplying water to that portion of the generator farthest from the furnace, controlling-devices interposed between the pumps and the generator and means acting on one of said controlling-devices and adapted to be rendered operative by variations of the pressure of the fluid in the generator for controlling the fuel-supply means inversely with the variations of pressure and also one of said pumps, and means acting on other of said controlling-devices and adapted to be rendered operative with variations of the temperature of the fluid in the generator for controlling the other pump.

15. An apparatus for generating steam including in combination, a furnace, a generator, means for supplying water to the generator, and automatic means for simultaneously varying the size of the furnace and the supply of water.

16. An apparatus for generating steam including in combination, a furnace, a generator, means for supplying water to the generator, controlling-mechanism for said water-supplying means, and means connecting therewith and operating thereon and rendered operative by variations in the condition of the fluid in the generator for automatically varying both the size of said furnace and the supply of water.

17. An apparatus for generating steam including in combination, a furnace, a generator, means for supplying fuel to the furnace, means for supplying water to the generator, automatic means for varying the size of the furnace, and automatic means for varying both the supply of fuel to the furnace and the supply of water.

18. An apparatus for generating steam including in combination, a furnace, a generator, means for supplying fuel to the furnace, means for supplying water to the generator, controlling-mechanism for said water-supplying means, and means connecting therewith and operating thereon and rendered operative by variations of the condition of the fluid in the generator for varying the size of the furnace, and automatic means for varying both the supply of fuel to the furnace and the supply of water.

19. An apparatus for generating steam including in combination, a furnace, a generator, means for supplying fuel to the furnace, means for supplying water to the generator, automatic means for varying the size of the furnace, controlling-mechanism for said water-supplying means, and means connecting therewith and operating thereon and rendered operative by variations of the condition of the fluid in the generator for varying both the supply of fuel to the furnace and the supply of water.

20. An apparatus for generating steam including in combination, a furnace, a generator, means for supplying fuel to the furnace, means for supplying water to the generator, means rendered operative by variations of the condition of the fluid in the generator for varying the size of the furnace, controlling-mechanism for said water-supplying means and means connecting therewith and operating thereon and rendered operative by variations of the condition of the fluid in the generator for varying both the supply of fuel to the furnace and the supply of water.

21. An apparatus for generating steam including in combination, a furnace, a generator, means for supplying water to the generator, and controlling-mechanism for said supplying means, and means connecting therewith and adapted to be rendered operative by variations in the pressure of the fluid in the generator for automatically varying both the size of the said furnace and the supply of water.

22. An apparatus for generating steam including in combination, a furnace, a generator, means for supplying fuel to the furnace, means for supplying water to the generator, controlling-mechanisms for the respective supplying means, means acting on certain of said mechanisms and rendered operative by variations of the pressure of the fluid in the generator for varying the size of the furnace, and means acting on other of said mechanisms and rendered operative by variations of the pressure of the fluid in the generator for varying both the supply of fuel to the furnace and the supply of water.

23. An apparatus for generating steam including in combination, a furnace, a generator, means for supplying liquid to the generator, controlling-mechanism for said supplying-means, and means connecting therewith and adapted to be rendered operative by the condition of the fluid in the generator for varying the supply of the liquid, and means also acting on said controlling mechanism and rendered operative by variations in the condition of the fluid in the generator for automatically varying the size of the said furnace.

24. An apparatus for generating steam including in combination, a furnace, a generator, means for supplying liquid to the generator, controlling-mechanism for said supplying-means, and means connecting therewith and adapted to be rendered operative by the condition of the fluid in the generator for varying the supply of the liquid, means for supplying fuel to the furnace, automatic means for varying the size of the furnace, and automatic means for varying the supply of fuel to the furnace.

25. An apparatus for generating steam including in combination, a furnace, a generator, means for supplying liquid to the generator, controlling-mechanism for said supplying-means, and means connecting therewith and adapted to be rendered operative by the condition of the fluid in the generator for varying the supply of the liquid, means for supplying fuel to the furnace, a controlling-instrumentality therefor, means acting on said instrumentality and rendered operative by variations of the condition of the fluid in the generator for varying the size of the furnace, and automatic means for varying the supply of fuel to the furnace.

26. An apparatus for generating steam including in combination, a furnace, a generator, means for supplying liquid to the generator, controlling-mechanism for said supplying-means, and means connecting therewith and adapted to be rendered operative by variations of the condition of the fluid in the generator for varying the supply of liquid, means for supplying fuel to the furnace, automatic means for varying the size of the furnace, controlling-mechanism for said fuel-supplying means, and means connecting therewith and rendered operative by variations of the condition of the fluid in the generator for varying the supply of fuel to the furnace.

27. An apparatus for generating steam including in combination, a furnace, a generator, means for supplying liquid to the generator, controlling-mechanism for said supplying means, and means connecting therewith and adapted to be rendered operative by variations in the condition of the fluid in the generator for varying the supply of the liquid, means for supplying fuel to the furnace, controlling means for said fuel-supplying means, means connecting with said controlling means and rendered operative by variations in the condition of the fluid in the generator for varying the size of the furnace, and means also connecting with said controlling means and rendered operative by variations in the condition of the fluid in the generator for varying the supply of fuel to the furnace.

28. An apparatus for generating steam including in combination, a furnace, a generator, means for supplying liquid to the generator, controlling-mechanism for said supplying-means, and means connecting therewith and adapted to be rendered operative by variations in the condition of the fluid in the generator for varying the supply of the liquid, and means also acting on said controlling mechanism and rendered operative by variations in the pressure of the fluid in the generator for automatically varying the size of said furnace.

29. An apparatus for generating steam including in combination, a furnace, a generator, means for supplying liquid to the generator, controlling-mechanism for said supplying-means, and means connecting therewith and adapted to be rendered operative by variations in the condition of the fluid in the generator for varying the supply of the liquid, means for supplying fuel to the furnace, controlling means for said fuel-supplying means, means connecting with said controlling means and rendered operative by variations in the pressure of the fluid in the generator for varying the size of the furnace, and means also connecting with said controlling means and rendered operative by variations in the pressure of the fluid in the generator for varying the supply of fuel to the furnace.

In testimony whereof, I have signed my name to this specification, in the presence of two subscribing witnesses.

ALBERT A. E. STERZING.

Witnesses:
Wm. J. Dolan,
Edwin Seger.